United States Patent [19]

Fretwell

[11] Patent Number: 5,247,959
[45] Date of Patent: Sep. 28, 1993

[54] MULTI-FUNCTION VALVE

[75] Inventor: James K. Fretwell, South Anston, United Kingdom

[73] Assignee: Meggitt (UK) Limited, United Kingdom

[21] Appl. No.: 834,279

[22] PCT Filed: Aug. 14, 1990

[86] PCT No.: PCT/GB90/01280
§ 371 Date: Apr. 2, 1992
§ 102(e) Date: Apr. 2, 1992

[87] PCT Pub. No.: WO91/02916
PCT Pub. Date: Mar. 7, 1991

[30] Foreign Application Priority Data
Aug. 14, 1989 [GB] United Kingdom ............... 8918503

[51] Int. Cl.⁵ ........................................... G05D 16/06
[52] U.S. Cl. ........................... 137/116.3; 137/505.11; 137/210

[58] Field of Search ........... 137/116.3, 505.11, 505.18, 137/116.5, 210

[56] References Cited

U.S. PATENT DOCUMENTS 2,965,121 12/1960 Howlett ..................... 137/505.11 X
4,624,277 11/1986 Veite ............................. 137/116.3

FOREIGN PATENT DOCUMENTS 2243382 4/1975 France .
862756 3/1961 United Kingdom .

Primary Examiner—Alan Cohan

[57] ABSTRACT

A multi-function valve has a floating disc (24) with concentric annular ribs (25,27) on one face for cooperation with respective first and second seatings, and an annular rib (26) on its other face for cooperation with a third seating.

4 Claims, 3 Drawing Sheets

MULTI-FUNCTION VALVE

The invention relates to a multi-function valve of a kind, hereinafter referred to as of the kind described, comprising a housing with first and second chambers communicating via an internal port; the first chamber communicating with a first external port and incorporating a first fluid pressure-responsive element which is withdrawn against spring action in a direction away from the internal port in response to a pressure above a certain value in the first chamber; and the second chamber communicating with second and third external ports and incorporating a second fluid pressure-responsive annular element which is movable against spring action in response to a pressure above a certain value in the second chamber, the arrangement being such that advance of the first pressure-responsive element upon sufficiently low pressure occurring in the first chamber separates first and second complementary annular seatings respectively on a first closure element and on the housing around the internal port to place the first and second chambers, and hence also the first and second external ports, in communication with one another while the first and second chambers remain sealed from the third external port; withdrawal of the first pressure-responsive element upon sufficiently high pressure occurring in the first chamber withdraws a second closure element away from the first closure element to separate third and fourth annular seatings respectively on the first and second closure elements to place the first chamber, and hence the first external port, in communication with the third port through the first closure element and the second pressure-responsive element, whilst the second external port is sealed from the first and third external ports; and movement of the second pressure-responsive element upon sufficiently high pressure occurring in the second chamber separates fifth and sixth annular seatings to place the second chamber, and hence the second external port, in communication with the third annular port, whilst the first chamber is sealed from the second and third external ports.

The first and second pressure-responsive elements may each be, for example, a resilient or spring loaded bellows, or a spring loaded diaphragm.

A valve of this kind may be used as a low temperature valve in conjunction with a pressurized liquefied gas tank, to provide pressure build-up, pressure relief and economizer functions.

In one known valve of the kind described, the first and third seatings are provided concentrically on the first closure element which forms one end piece of a resilient bellows constituting the second fluid pressure-responsive element and the fifth seating is provided on an end piece at the opposite end of the bellows.

In accordance with one aspect of the present invention, in a multi-function valve of the kind described, the second fluid pressure-responsive element is a resilient bellows, which is movable in a direction away from the internal port in response to the pressure above the certain value in the second chamber, and which is sealed at one end to the third external port, the sixth seating being provided on an end piece at the opposite end of the bellows; the first closure element being a floating annular disk with the first and third seatings formed by raised concentric annular ribs on one face of the disk, and the fifth seating being formed as a raised rib on the opposite face of the disk.

The floating disc may have three concentric annular ribs in the same configuration on each of its faces, the first and third seatings being provided by the radially innermost and outermost ribs on one face, and the fifth seating being provided by the radially intermediate rib on the other face. The disk can then be used "either way up", and, upon servicing of the valve, can be "turned over" to provide three new unworn ribs as the first, third and fifth seatings.

With this arrangement, all the critical seatings are provided on the single floating annular disk, which can readily and cheaply be turned over or replaced if any of the seatings become damaged, without having to replace more expensive components of one or both of the pressure-responsive elements. The floating disk, if made of a plastics material with some flexibility, also provides better sealing ability upon misalignment of the pressure responsive elements and or closure elements, resulting, for example, from bellows stresses which may otherwise cause leakage past the complementary seatings.

In accordance with a second, independent, aspect of the present invention, in a multi-function valve of the kind described, the first fluid pressure-responsive element is a diaphragm, the periphery of which is fixed and sealed to the housing, and a centre portion of which carries the second closure element, the diaphragm having, radially between the centre portion and periphery, an annular undulation presenting a corrugation in axial section.

The provision of the undulation at a position where most of the deflection of the diaphragm occurs, reduces stresses and enables greater deflection to be employed, giving higher capacity to the valve.

An example of a valve incorporating the two aspects of the present invention, and a possible use of the valve, are illustrated in the accompanying drawings, in which.

Figure 1:
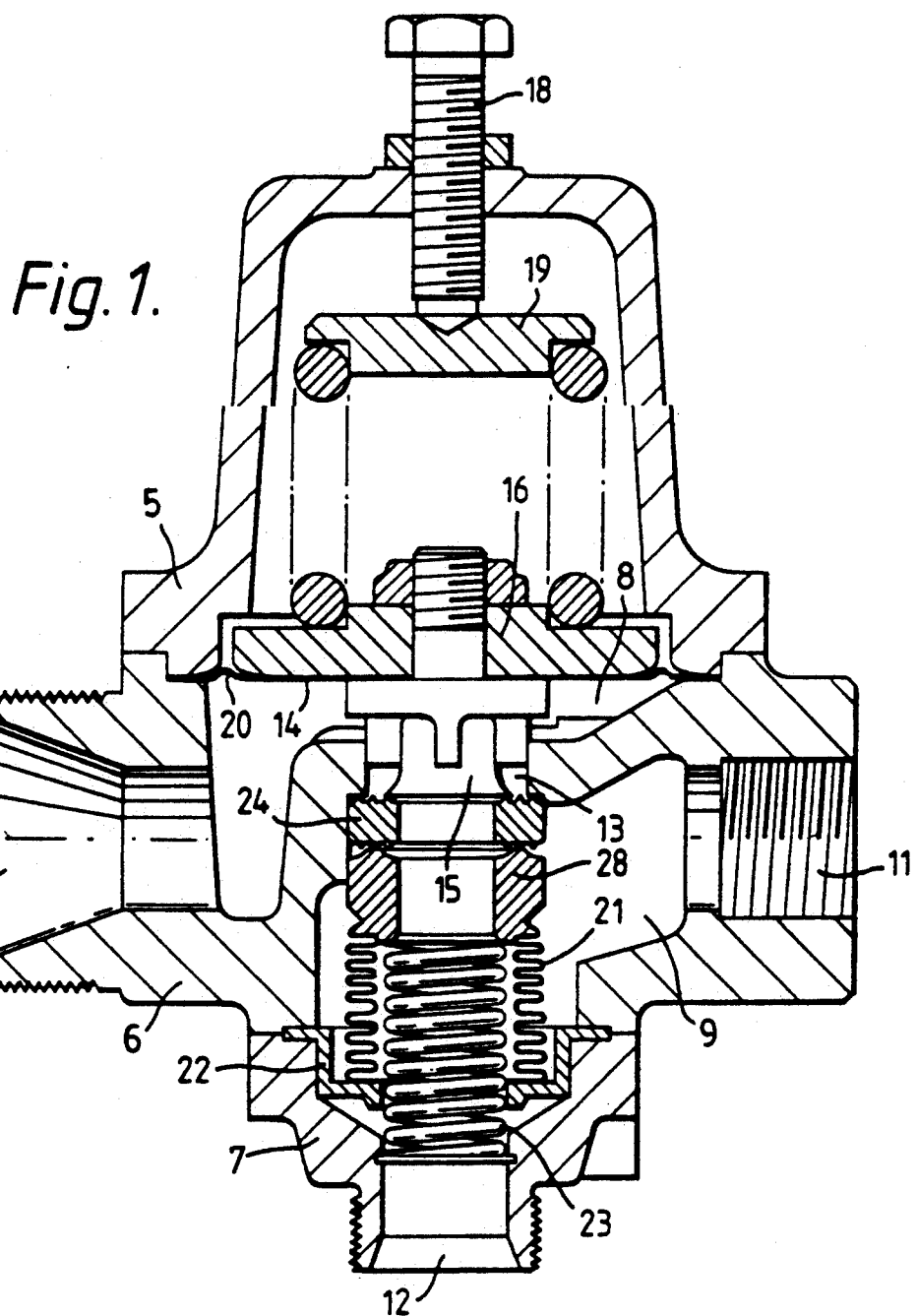
FIG. 1 is an axial section through the valve.

As shown in FIG. 1, the valve comprises a housing in three mutually engaging and sealed parts 5, 6 and 7 with first and second chambers 8 and 9, and first second and third external ports 10, 11 and 12, each provided with screw threaded couplings. The chambers 8 and 9 are interconnected via an internal port 13.

The wall of the first chamber 8 is partly defined by a diaphragm 14, which is fixed and sealed around its periphery between the housing parts 5 and 6, and which carries a second closure element 15, with a back-up plate 16, on which there reacts a helically coiled compression spring 17, the tension of which is adjustable by a screw threaded stud 18 acting via a plate 19. The diaphragm is provided with an annular undulation 20 in accordance with the second aspect of the invention. The diaphragm, which is typically made of 316 stainless steel, Monel nickel copper alloy, or phosphor bronze, may be 3-5 thousandths of an inch thick, the greater thickness being most appropriate for high pressure applications.

Figure 2:
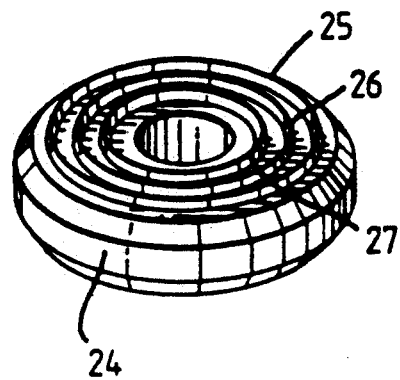
FIG. 2 is a perspective view of a disk.

The second chamber 9 contains a bellows 21, the interior of which is sealed to the third external port 12, and from the chamber 9, by a flexible seal 22, trapped between the housing parts 6 and 7, and which is urged to expand upwardly in FIG. 1 by a helically coiled compression spring 23 acting on an upper end piece 28 which is fixed and sealed to the top of the bellows. A first closure element 24, in the form of a slightly resilient annular disk made of PTFE is loosely located between the bottom of the second closure member 15 and the top of the end piece 28. As shown in FIG. 2, the disc 24 has, identically on each face three raised concentric annular ribs 25,26,27. The ribs 25,27 on the upper face of the disc and the rib 26 on the lower face of the disc provide knife edge seatings which cooperate respectively with second, fourth and sixth annular seatings provided respectively by flat surfaces, around the underside of the internal port 13, on the underside of the second closure element 15, and on the upper surface of the end piece 28.

Figure 3:
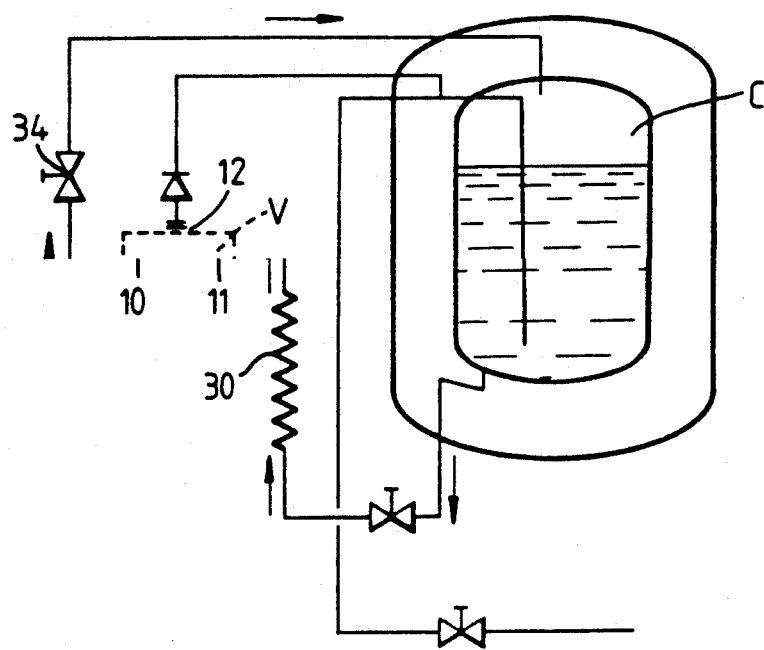
FIGS. 3, 4 and 5 are diagrammatic views showing the valve in combination with a liquefied gas tank and operating respectively in pressure build-up, pressure relief and economizer functions.
Figure 4:
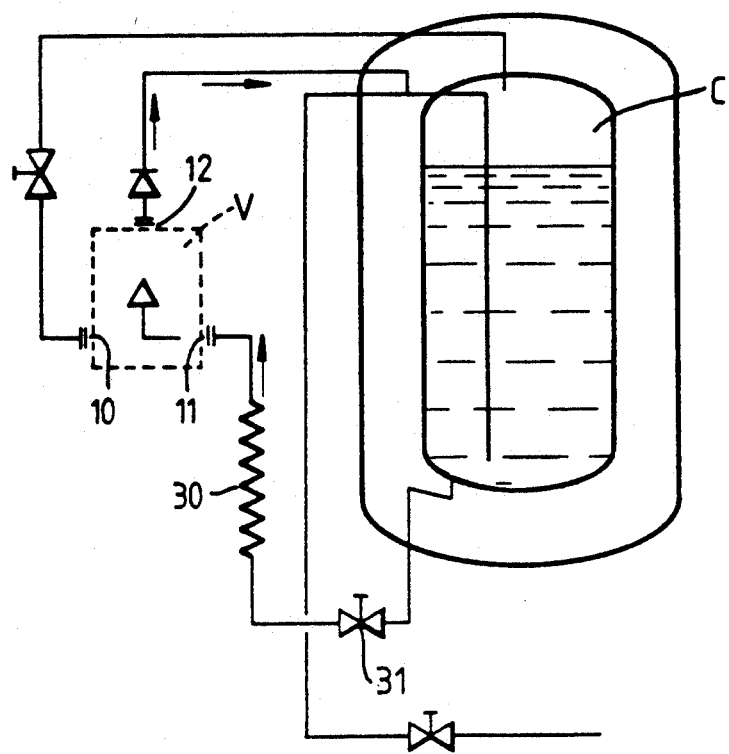
Figure 5:
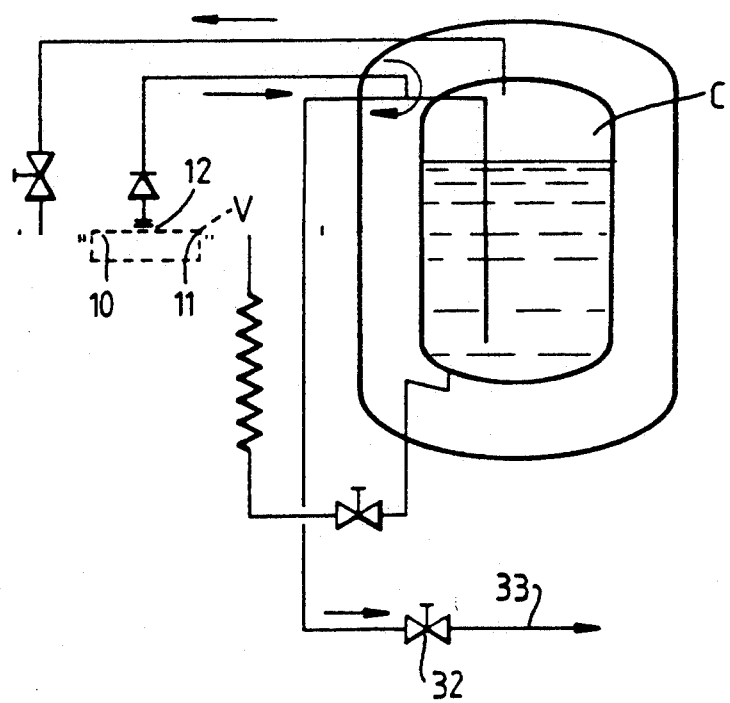

The valve may be used, as represented by the valve V, in cooperation with a liquefied gas vessel C, as shown in FIGS. 3, 4 and 5.

When carrying out the function represented in FIG. 3, during pressure build-up, the system pressure reflected through the port 10 will be low so that the spring 17 will force the diaphragm 14 downwards, thus pushing downwards the parts 24 and 28 and compressing the bellows 21. This separates the seating 25 from the seating around the internal port 13, and interconnects ports 10 and 11, thus allowing liquid from the vessel C into a vaporizer 30, which converts the liquid into gas. The gas then passes through the valve V and flows back into the top of the vessel through a valve 34. When the pressure rises to a point where the force on the diaphragm 14 is sufficient to raise the diaphragm, so that the parts reassume the position shown in FIG. 1, the ports 10 and 11 are sealed from one another and the pressure build-up stops.

FIG. 4 shows a pressure relief function of the valve. If a liquid feed valve 31 is closed, then liquid may become trapped in the vaporizer 30 between the valve 31 and the valve V. When this liquid vaporizes and increases the pressure in the vaporizer, the pressure is then higher than that in the vessel C. When this pressure difference approaches a value, such as 5 bar, which may be varied upon changing the spring 23, the pressure acting on the end piece 28 and bellows pushes these components away from the closure element 24, owing to the effectively different downwardly and upwardly facing areas of the bellows. This separates the seating 26 from the top of the end piece 28 and interconnects the ports 11 and 12, thereby allowing gas to flow from the vaporizer through to the vessel C until liquid trapped in the vaporizer has been vaporized.

FIG. 5 represents an economizer function of the valve. When the vessel C has been left unused for a long period, heat will leak through a vacuum jacket of the vessel, causing the pressure within the vessel to rise above the normal working pressure. This is provided for by relief valves set at approximately 20% above the working pressure. At this pressure the relief valve will bleed off vapour at the required capacity to hold the pressure steady. Upon resuming normal working, because liquid is drawn from the vessel C through a valve 32 in a user line 33 and passed through a vaporizer, to provide gas for various purposes, it may take many hours for the pressure in the vessel to fall back to the working pressure and the relief valve to stop weeping gas to atmosphere. For this reason the valve V acts in a economizer function to connect the gas user 33 line to the top of the vessel C, in order to lower the pressure at a much faster rate, and hence saving gas which would have been lost through the relief valve. In this function the high pressure from the top of the vessel is reflected through the port 10 to the first chamber 8, and, overcoming the spring 17, raises the diaphragm 14 and second closure member 15 off the seating 27. This interconnects the ports 10 and 12 and hence the top of the vessel C to the bottom of the vessel and the user line 33.

I claim:

1. A valve-comprising:
   a housing having first and second chambers which communicate via an internal port,
   said first chamber further communicating with a first external port and including a first fluid pressure-responsive element which is withdrawn against spring action in a direction away from the internal port in response to a pressure in the first chamber above a preselected value,
   said second chamber further communicating with second and third external ports and incorporating a second fluid pressure-responsive annular element which is movable against spring action in response to a pressure in the second chamber above a preselected value,
   the valve being constructed such that advance of the first pressure-responsive element upon sufficiently low pressure occurring in the first chamber separates first and second complementary annular seatings respectively on a first closure element and on the housing around the internal port to place the first and second chambers, and the first and second external ports, in communication with one another while the first and second chambers remain sealed from the third external port,
   wherein withdrawal of the first pressure-responsive element upon sufficiently high pressure occurring in the first chamber withdraws a second closure element away from the first closure element to separate third and fourth annular seatings respectively on the first and second closure elements to place the first chamber, and the first external port, in communication with the third port through the first closure element and the second pressure-responsive element, while the second external port is sealed from the first and third external ports.
   wherein movement of the second pressure-responsive element upon sufficiently high pressure occurring in the second chamber separates fifth and sixth annular seatings to place the second chamber, and the second external port, in communication with the third external port, while the first chamber is sealed from the second and third external ports,
   said second fluid pressure-responsive element comprising a bellows which is movable in a direction away from the internal port in response to a pressure above the preselected value in the second chamber, said bellows being sealed at one end to the third external port and said sixth annular seating being provided on an end piece at an opposite end of the bellows, and
   said first closure element comprising a floating annular disk with the first and third seatings formed by raised concentric annular ribs on one face of the disk, said fifth annular seating being formed as a raised rib on an opposite face of the disk.

2. The valve as set forth in claim 1, wherein the floating disk has three concentric annular ribs in the same configuration on both of its faces, the first and third annular seatings being provided by the radially innermost and outermost ribs on one face, and the fifth annular seating being provided by the radially intermediate rib on the other face.

3. The valve as set forth in either claim 1 or 2, wherein the first fluid pressure-responsive element is a diaphragm, a periphery of the diaphragm being fixed and sealed to the housing and wherein a center portion of the diaphragm carries the second closure element, the diaphragm having, radially between the center portion and the periphery, an annular undulation which presents a corrugation in axial section.

4. A valve comprising:
   a housing having first and second chambers which communicate via an internal port,
   said first chamber further communicating with a first external port and including a first fluid pressure-responsive element which is withdrawn against spring action in a direction away from the internal port in response to a pressure in the first chamber above a preselected value,
   said second chamber further communicating with second and third external ports and incorporating a second fluid pressure-responsive annular element which is movable against spring action in responsive to a pressure in the second chamber above a preselected value,
   the valve being arranged such that advance of the first pressure-responsive element upon sufficiently low pressure occurring in the first chamber separates first and second complementary annular seating respectively on a first closure element and on the housing around the internal port to place the first and second chambers, and the first and second external ports, in communication with one another while the first and second chambers remain sealed from the third external port,
   wherein withdrawal of the first pressure-responsive element upon sufficiently high pressure occurring in the first chamber withdraws a second closure element away from the first closure element to separate third and fourth annular seatings respectively on the first and second closure elements to place the first chamber, and the first external port, in communication with the third port through the first closure element and the second pressure-responsive element, while the second external port is sealed from the first and third external ports,
   wherein movement of the second pressure-responsive element upon sufficiently high pressure occurring in the second chamber separates fifth and sixth annular seatings to place the second chamber, and the second external port, in communication with the third external port, while the first chamber is sealed from the second and third external ports,
   said first fluid pressure-responsive element comprising a diaphragm, a periphery of the diaphragm being fixed and sealed to the housing and wherein a center portion of the diaphragm carries the second closure element, the diaphragm having, radially between the center portion and the periphery, and annular undulation which presents a corrugation in axial section.

* * * * *